US011573823B2

(12) United States Patent
Li et al.

(10) Patent No.: US 11,573,823 B2
(45) Date of Patent: Feb. 7, 2023

(54) PARALLEL EXECUTION OF APPLICATIONS

(71) Applicant: International Business Machines Corporation, Armonk, NY (US)

(72) Inventors: Shuo Li, Beijing (CN); ShengYan Sun, Beijing (CN); Xiaobo Wang, Beijing (CN); Hong Mei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 16/686,243

(22) Filed: Nov. 18, 2019

(65) Prior Publication Data
US 2021/0149717 A1 May 20, 2021

(51) Int. Cl.
*G06F 9/46* (2006.01)
*G06F 9/48* (2006.01)

(52) U.S. Cl.
CPC ...... *G06F 9/4881* (2013.01); *G06F 2209/482* (2013.01)

(58) Field of Classification Search
CPC ...... G06F 9/4881; G06F 9/505; G06F 9/5027; G06F 9/5005; G06F 2209/482; G06F 16/2453; G06F 16/24532; G06F 16/24542; G06F 16/24547; G06F 16/24549
See application file for complete search history.

(56) References Cited

U.S. PATENT DOCUMENTS

| 5,121,494 A | 6/1992 | Dias et al. |
| 6,289,343 B1 * | 9/2001 | Freund ...................... G06F 9/52 707/999.008 |
| 6,546,403 B1 | 4/2003 | Carlson, Jr. et al. |

(Continued)

FOREIGN PATENT DOCUMENTS

CN 109901926 A * 6/2019 ............... G06F 9/50

OTHER PUBLICATIONS

Lohman et al., Minimizing Page Faults to a Finite Buffer As Applied to Nested Scans to Satisfy a Relational Join, Feb. 1, 2005, IP.com (Year: 2005).*

(Continued)

*Primary Examiner* — Emerson C Puente
*Assistant Examiner* — Zhi Chen
(74) *Attorney, Agent, or Firm* — Edward J. Wixted, III (57) ABSTRACT

In an approach, a processor, responsive to requesting to perform a plurality of applications including a first application and a second application, determines that the first application and the second application have been performed sequentially during a previous time period. A processor, responsive to determining that the first and second applications have been performed in sequence during the previous time period, obtains, a first set of database operations associated with the first application and a second set of database operations associated with the second application. A processors, responsive to determining that the first set of database operations and the second set of database operations are free of conflict, generates an execution schedule indicating that the first application and the second application are to be performed in parallel. A processors performs the plurality of applications based on the execution schedule.

17 Claims, 8 Drawing Sheets

(56) References Cited

U.S. PATENT DOCUMENTS

| | | | | |
|---|---|---|---|---|
| 7,600,221 | B1* | 10/2009 | Rangachari | G06F 9/3808 |
| | | | | 712/215 |
| 7,698,272 | B2* | 4/2010 | Betten | G06F 16/24532 |
| | | | | 717/149 |
| 9,058,218 | B2 | 6/2015 | Bareness et al. | |
| 9,448,842 | B1* | 9/2016 | Lemarinier | G06F 9/5005 |
| 10,691,695 | B2* | 6/2020 | Mittal | G06F 16/24556 |
| 11,042,414 | B1* | 6/2021 | Byagowi | G06F 9/505 |
| 2002/0184210 | A1* | 12/2002 | Khan | G06F 16/284 |
| 2004/0034642 | A1* | 2/2004 | Szilagyi | G06F 9/524 |
| 2006/0173885 | A1* | 8/2006 | Moir | G06F 9/466 |
| 2008/0016095 | A1* | 1/2008 | Bhatnagar | G06F 16/90335 |
| | | | | 707/E17.14 |
| 2008/0052266 | A1* | 2/2008 | Goldstein | G06F 16/24549 |
| 2008/0189305 | A1* | 8/2008 | Bildhaeuser | G06F 16/24552 |
| 2008/0319959 | A1* | 12/2008 | Bireley | G06F 8/447 |
| 2009/0070313 | A1* | 3/2009 | Beyer | G06F 16/24 |
| | | | | 707/999.005 |
| 2009/0235254 | A1* | 9/2009 | Michael | G06F 9/52 |
| | | | | 718/101 |
| 2009/0327242 | A1 | 12/2009 | Brown et al. | |
| 2011/0061057 | A1 | 3/2011 | Harris et al. | |
| 2011/0225167 | A1* | 9/2011 | Bhattacharjee | G06F 16/284 |
| | | | | 711/E12.001 |
| 2013/0054567 | A1* | 2/2013 | Graefe | G06F 16/24542 |
| | | | | 707/718 |
| 2016/0253382 | A1* | 9/2016 | Shadmon | G06F 16/2453 |
| | | | | 707/718 |
| 2016/0350375 | A1* | 12/2016 | Das | G06F 16/2456 |
| 2017/0024258 | A1* | 1/2017 | Reid | G06F 9/4843 |
| 2017/0116271 | A1* | 4/2017 | Ziauddin | G06F 16/24539 |
| 2017/0132429 | A1* | 5/2017 | Bell | G06F 21/6218 |
| 2017/0293654 | A1* | 10/2017 | Cao | G06F 16/24568 |
| 2017/0344605 | A1* | 11/2017 | Wells | G06F 16/2453 |
| 2018/0260441 | A1 | 9/2018 | Li et al. | |
| 2019/0205448 | A1* | 7/2019 | Sharma | G06F 16/24545 |
| 2019/0227844 | A1* | 7/2019 | Horii | G06F 9/505 |

OTHER PUBLICATIONS

Blanton et al., Microsoft Computer Dictionary, 2002, Microsoft Press, 5th ed, p. 296 (Year: 2002).*

"Wasted resources driven database job scheduler", An IP.com Prior Art Database Technical Disclosure, Disclosed Anonymously, IP.com No. IPCOM000246529D, Published Jun. 15, 2016, 4 pages, <https://priorart.ip.com/voucher-purchase/IPCOM000246529D>.

Mell et al., "The NIST Definition of Cloud Computing", Recommendations of the National Institute of Standards and Technology, Special Publication 800-145, Sep. 2011, 7 pages.

* cited by examiner

PARALLEL EXECUTION OF APPLICATIONS

BACKGROUND

The present disclosure relates to the field of computing, and more specifically, to parallel execution of applications.

With a rapid development of computer technology, people are more and more relying on the computing capabilities of computers for performing all kinds of tasks. For example, an employee of a bank may update a huge amount of data or transaction of the bank to a database through applications or programs on a computer. In some cases, some of the plurality of applications or programs may be independent of each other, and therefore can be executed in parallel. In some other cases, one application may be dependent on another application, and therefore cannot be performed until the other application is finished. An employee may, however, be unaware of whether some of the plurality of applications can be executed in parallel.

SUMMARY

Aspects of an embodiment of the present invention disclose a method, computer program product, and computer system. A processor, responsive to requesting to perform a plurality of applications including a first application and a second application, determines that the first application and the second application have been performed sequentially during a previous time period. A processor, responsive to determining that the first and second applications have been performed in sequence during the previous time period, obtains, a first set of database operations associated with the first application and a second set of database operations associated with the second application. A processors, responsive to determining that the first set of database operations and the second set of database operations are free of conflict, generates an execution schedule indicating that the first application and the second application are to be performed in parallel. A processors performs the plurality of applications based on the execution schedule.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
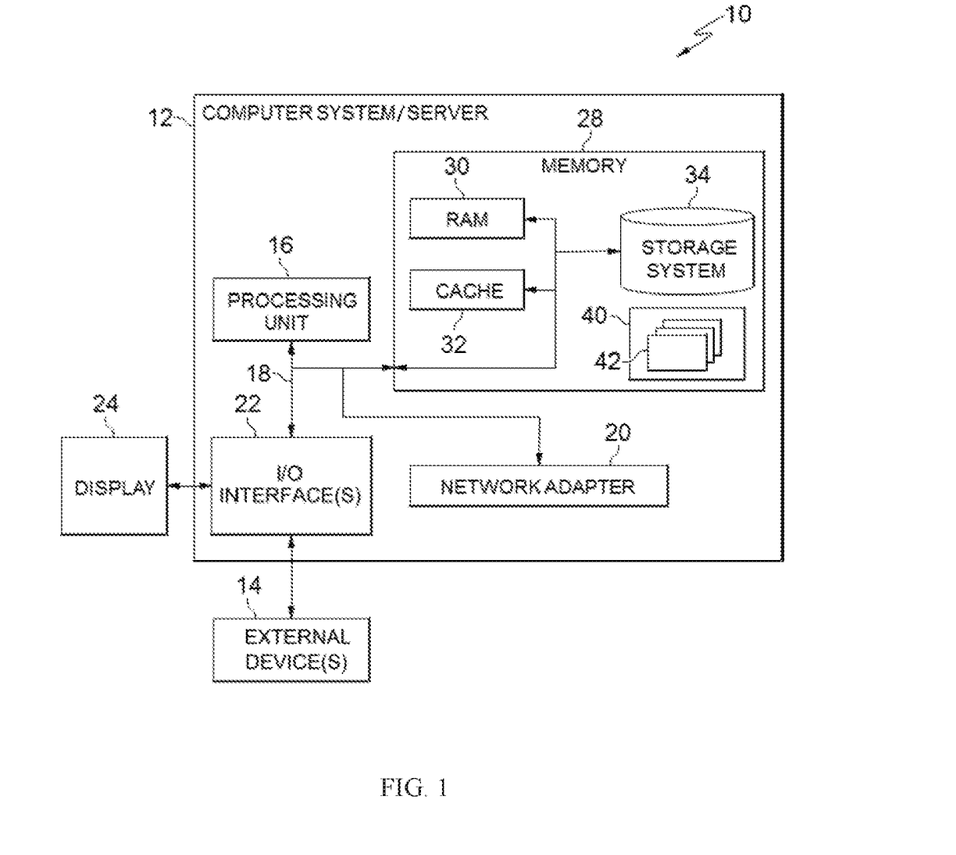
FIG. 1 depicts a cloud computing node according to an embodiment of the present disclosure.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
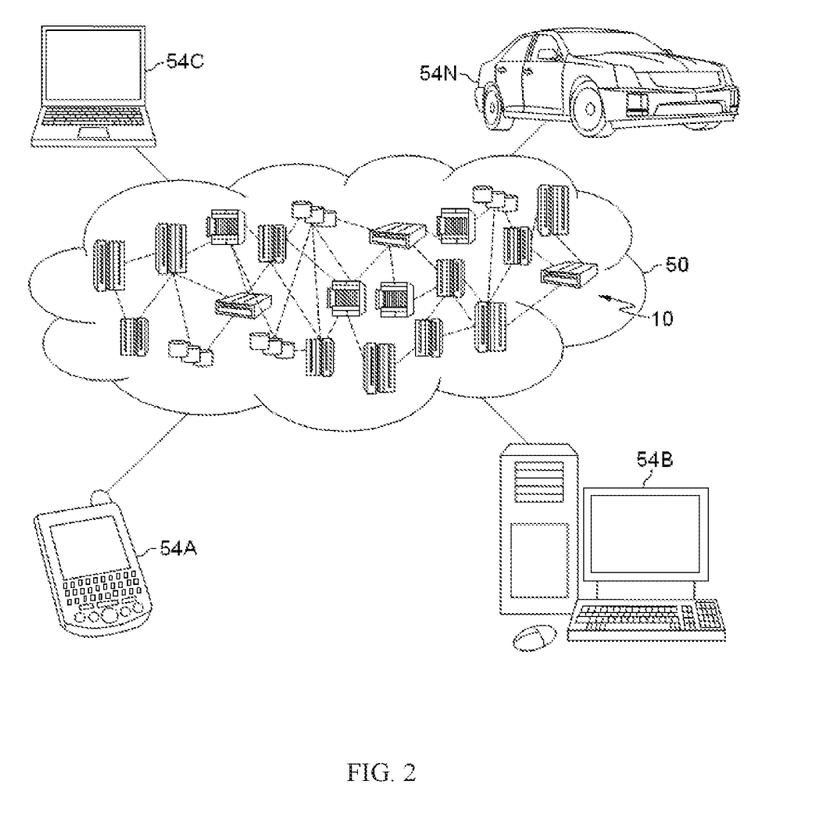
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
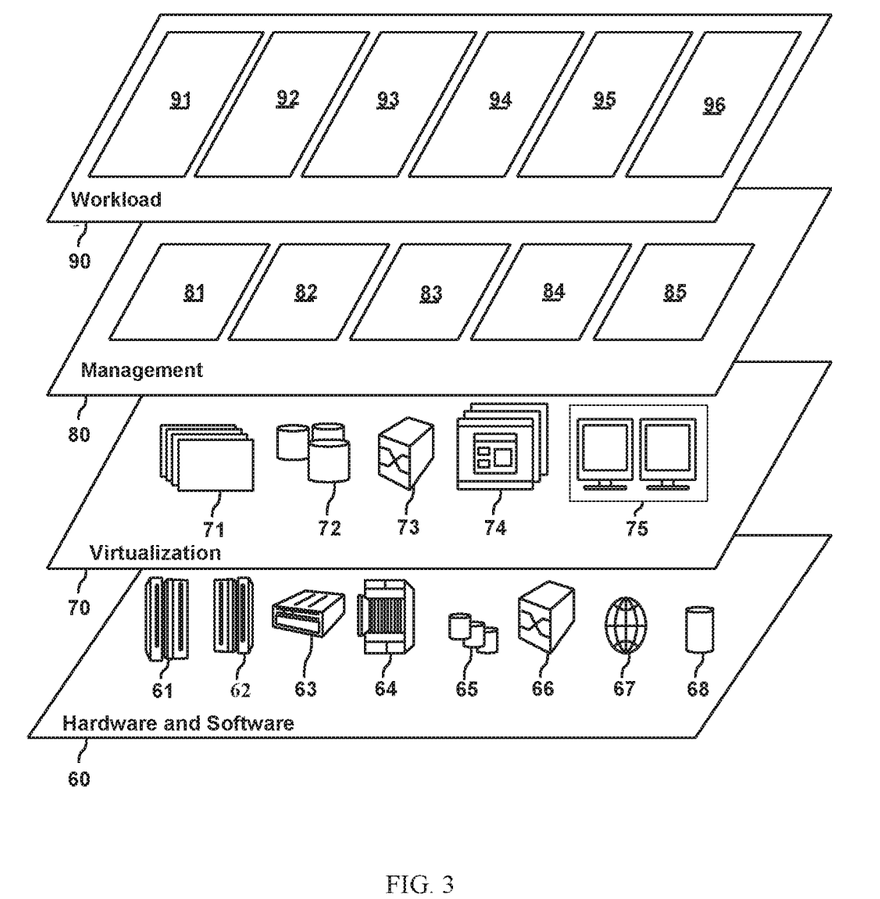
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and parallel execution 96. The parallel execution 96 may implement the solution of performing a first application and a second application in parallel upon determining that a first set of database operations associated with the first application and a second set of database operations associated with the second application are free of conflict.

Upon processing a database task, for example a task for updating a huge amount of data to a database, a user may utilize a plurality of applications or programs for performing a corresponding portion of the database task respectively. Such an application or a program may also be referred to as a batch job, and during the execution, the same database operations would be applied to multiple data objects by the application or program. However, a user is typically unaware of the detailed implementation (e.g., the source code) for these applications or programs, and the user is therefore unaware about whether any of the plurality of applications can be performed in parallel or not. As a result, most of the plurality of applications are to be scheduled by the user to be performed in sequence for avoiding any unexpected conflicts.

However, since the amount of the data to be processed is typically quite large, performing the plurality of applications in sequence would lead to a huge cost of time, which in some situations may be unacceptable.

Embodiments of the present invention recognize that it would be advantageous to automatically execute the plurality of applications in parallel. In order to at least partially solve one or more of the above problems, and other potential problems, example embodiments of the present disclosure propose parallel execution of applications. In general, a request to perform a plurality of applications including at least a first application and a second application is received. It can then be determined whether the first and second applications have been performed in sequence during a previous time period. In accordance with a determination that the first and second applications have been performed in sequence during the previous time period, a first set of database operations associated with the first application and a second set of database operations associated with the second application can be obtained. In accordance with a determination that the first and second sets of database operations are free of conflict, an execution schedule associated with the plurality of applications is generated, indicating, at least, that the first and second applications are to be performed in parallel. The plurality of applications are performed based on the execution schedule. In this way, the plurality of applications can be automatically performed in parallel based on a historical execution of the plurality of applications as well as the associated database operations, thereby improving the efficiency for the execution of the plurality of applications.

Figure 4:
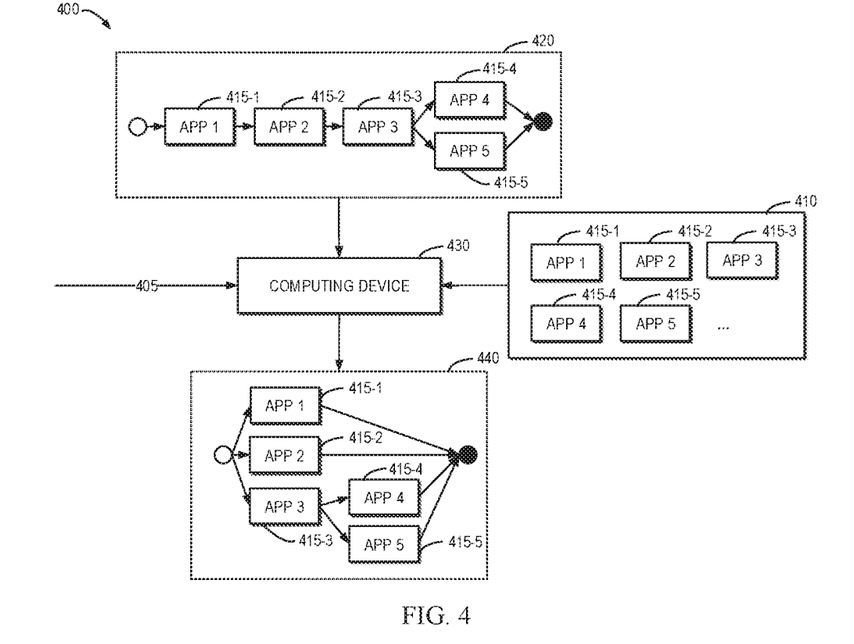
FIG. 4 depicts an environment in which embodiments of the present disclosure can be implemented.

FIG. 4 depicts an environment 400 in which embodiments of the present disclosure can be implemented. As shown in FIG. 4, the environment 400 comprises a computing device 430. The computing device can receive a request 405 for performing a plurality of applications 410. As only an example, rather than limitation, the plurality of applications 410 may comprise application 1 415-1, application 2 415-2, application 3 415-3, application 4 415-4, and application 5 415-5. In some embodiments, the plurality of applications 410 may be resided on a storage device coupled to the computing device 430, and may be performed by the computing device 430 in response to the request 405.

As shown in FIG. 4, the computing device 430 can also receive a historical execution schedule 420 for the plurality of applications 410. In some embodiments, the historical execution schedule 420 may be configured by the user. Alternatively, the historical execution schedule 420 may also be determined by the computing device 430 based on the historical execution of the plurality of applications 420 during a previous time period. For example, the example historical execution schedule 420 is shown in FIG. 4 as starting from application 1 415-1, following with application 2 415-2 and application 3 415-3 in sequence, and then application 4 415-4 and application 5 415-5 in parallel.

The computing device 430 can generate an execution schedule 440 for the plurality of applications 410 bases on the historical execution schedule 420 and the database operations associated with at least some of the plurality of applications 410. For example, as shown in FIG. 4, the application 1 415-1 and application 2 415-2 have been performed in sequence during the previous time period according to the historical execution schedule 420. In accordance with a determination that a first set of database operations associated with application 1 415-1 and a second set of database operations associated with application 2 415-2 are free of conflict, the computing device 430 may generate the execution schedule 440 for indicating that the application 1 415-1 and application 2 415-2 are to be performed in parallel. In this way, the computing device 430 may automatically perform the plurality of applications in parallel based on the historical execution of the plurality of applications as well as the associated database operations, thereby improving the efficiency for performing the plurality of applications.

It should be noted that the specific number of applications and the specific historical execution schedule or the generated execution schedule are only for illustration rather than limitation to the present disclosure. Any suitable number of applications or any suitable execution schedules are applicable.

Figure 5:
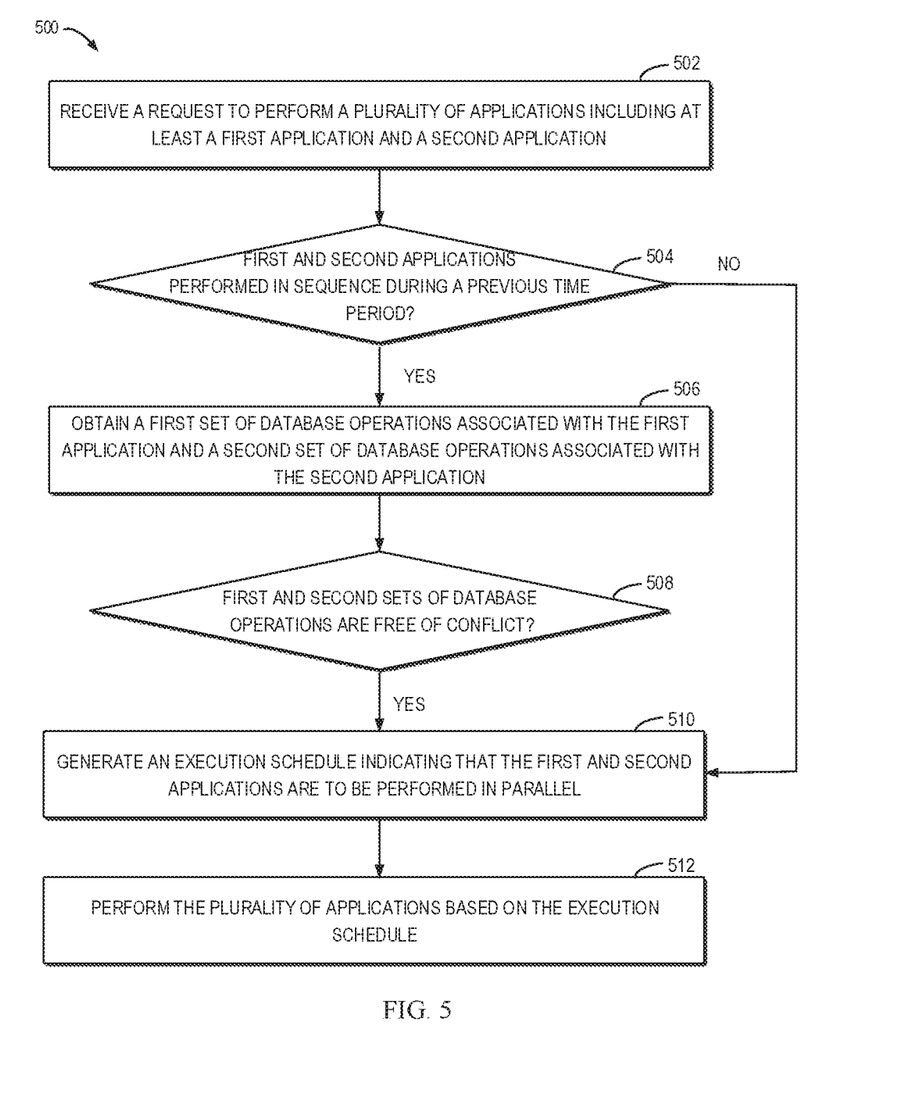
FIG. 5 depicts a flowchart of an approach for parallel execution of applications according to an embodiment of the present disclosure.

FIG. 5 illustrates a flowchart of a method 500 of parallel execution of applications according to embodiments of the present disclosure. The method 500 can be implemented by the computing device 430 shown in FIG. 4. Acts involved in the method 500 will be described with reference to the environment 400 as shown in FIG. 4.

At block 502, the computing device 430 receives a request 405 to perform a plurality of applications 410 including a first application and a second application. Taking FIG. 4 as an example, the plurality of applications 410 for example include a first application 1 415-1 and a second application 2 415-2. In some embodiments, a user may send the computing device 430 the request 405 via a client device communicatively coupled with the computing device 430. For example, a user may further be provided with a user interface, for selecting from an application repository, the plurality of applications 410 to be performed.

At block 504, the computing device 430 determines whether the first and second applications have been performed in sequence during a previous time period. In some embodiments, the computing device 430 may monitor the execution of the first of second applications during a previous time period (e.g., one week or one month) and determine the historical execution schedule 420 for the plurality of applications 410. It should be understood that the term "in sequence" here means that one application has been performed prior to another application, and the term "have been performed in sequence during a previous time period" here means that the sequence was not changed during the previous time period.

For example, if a first application has been always performed in sequence with a second application during the previous time period, the historical execution schedule 420 may be determined for indicating that the first and second applications have been performed in sequence. In another case, if the first and second were ever performed in parallel during the previous time period, the historical schedule 420 may be determined for indicating that the first and second applications have not been performed in sequence during the previous time period and can be performed in parallel. It should be understood that the term "in parallel" here means that one application may be performed when another application is being performed. In a further case, if the first application was ever performed prior to the second application and also ever performed after the second application during the previous time period, the historical schedule 420 may be determined for indicating that the first and second applications have not been performed in sequence during the previous time period and can be performed in parallel.

Alternatively, the computing device 430 may also obtain a historical execution schedule 420 which was pre-configured by a user. For example, a user may define a historical execution schedule 420 for the plurality of applications 410, for example, when the plurality of applications 410 were scheduled to be performed for the first time. The historical execution schedule 420 may be stored by the computing device 430 and then retrieved by the computing device 430 upon a new request for performing at least some of the plurality of applications 410.

Based on the historical execution schedule 420, the computing device 430 may determine whether the first and second applications have been performed in sequence during the previous time period. Continuing with the example in FIG. 4, it may be determined that the application 1 415-1 and the application 2 415-2 have been performed in sequence.

In accordance with a determination that the first and second applications were once performed in parallel during the previous time period or a determination that a sequence for performing the first and second applications was once changed during the previous time period at block 504, the method 500 proceeds to block 510, where the computing device 430 generates an execution schedule indicating, at least, that the first and second applications are to be performed in parallel. For example, if application 4 415-4 and application 5 415-5 were once performed in parallel during the previous time period, the historical execution schedule 420 may be determined indicating that the application 4 415-4 and application 5 415-5 can be performed in parallel. In another example, if application 4 415-4 was performed prior to the application 5 415-5 in one execution instance but was performed after the application 5 415-5 in another execution instance, the historical execution schedule 420 may be determined indicating that the application 4 415-4 and application 5 415-5 can be performed in parallel.

Continuing with the example in FIG. 4, the application 4 415-4 and application 5 415-5 have been performed in parallel according to the historical execution schedule 420, and the computing device 430 may generate the execution schedule 440 at least indicating that the application 4 415-4 and application 5 415-5 are to be performed in parallel.

In accordance with a determination at block 504 that the first and second applications have been performed in sequence during the previous time period, the method 500 proceeds to block 506, where the computing device 430 further obtains a first set of database operations associated with the first application and a second set of database operations associated with the second application.

In some embodiments, the computing device 430 may pre-compile the first and second applications to extract a first set of queries associated with the first application and a second set of queries with the second application, and then determine the first and second sets of database operations from the first and second sets of queries. For example, the computing device 430 may pre-compile the first and second applications to automatically recognize and extract the SQL queries included in the source code of the first and second applications. Based on the extracted SQL queries, the computing device 430 may then obtain the corresponding set of database operations.

At block 508, the computing device 430 determines whether the first and second sets of database operations are free of conflict. In some embodiments, after obtaining the first and second sets of database operations, the computing device 430 may compare the database elements included in the first and second sets of database operations. It should be noted that, the application discussed herein are mainly related to database operations, and the absence of conflict between the first and second sets of database operations can ensure that the first and second applications can be performed in parallel. For example, the computing device 430 may determine whether the first and second sets of database operations are related to a same database or a same table in a same database.

In some embodiments, the computing device 430 may further determine whether the type of database operations are free of conflict if a same database of a same table is involved by both of the first and second sets of database operations. For example, if both sets of database operations only comprise read operations with regard to a same table, the computing device 430 may determine that the first and second sets of database operations are free of conflict. In contrast, if any of the database operations comprises a modification operation (e.g., a write operation) to a same database element (e.g., a table or an entry), the computing device 430 may determine that there is confliction between the first and second sets of database operations.

In accordance with a determination at block 508 that the first and second sets of database operations are free of conflict, the method proceeds to block 510, where the computing device 430 generates an execution schedule 440 at least indicating that the first and second applications are to be performed in parallel. Continuing with the example in FIG. 4, for example, taking the application 1 415-1 and application 2 415-2 as the first and second applications. Upon determining that the first and sets of applications associated with application 1 415-1 and application 2 415-2 are free of conflict, the computing device 430 may generate an execution schedule 440 indicating that application 1 415-1 and application 2 415-2 are to be performed in parallel.

In some embodiments, the plurality of applications 410 further comprise a third application. The computing device 430 may generate the execution schedule 440 for the first, second and third applications based on both the historical execution schedule 420 as well as the third set of database operations associated with the third application. The process of block 508 will now be discussed with reference to FIG. 6.

Figure 6:
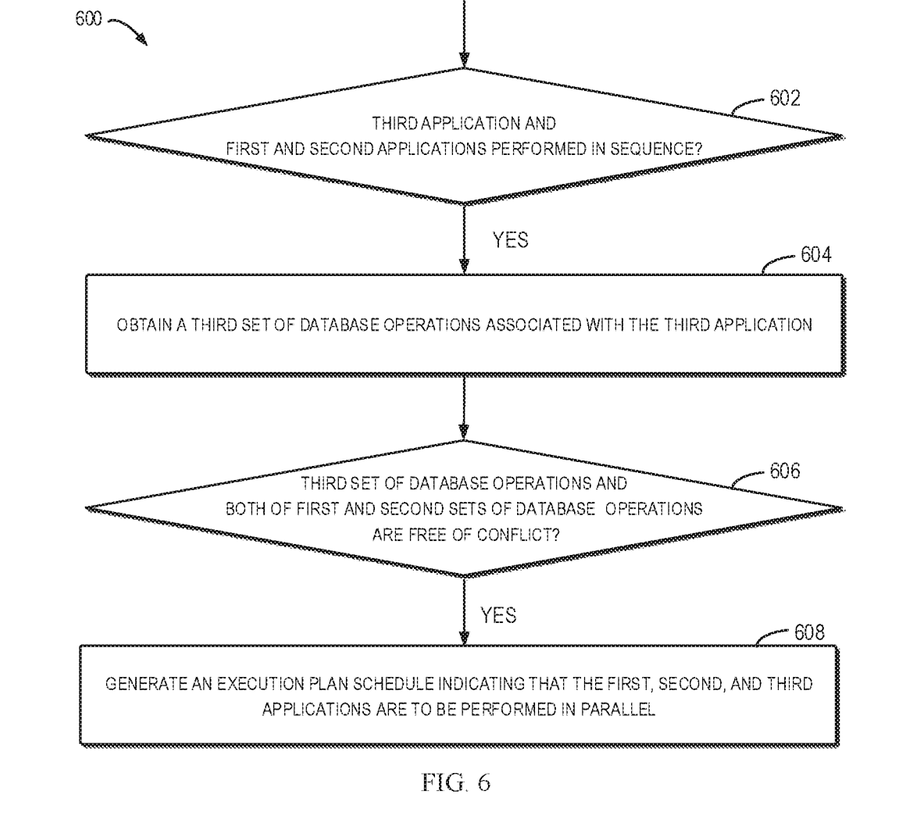
FIG. 6 depicts a flowchart of an approach for generating execution schedule according to an embodiment of the present disclosure.

As shown in FIG. 6, at block 602, the computing device 430 may first determine whether the third application and the first and second application have been performed in sequence during the previous time period. In accordance with a determination at block 602 that the first, second and third applications have been performed in sequence during the previous time period, the method proceeds to block 604, where the computing device 430 may obtain a third set of database operations associated with the third application. The process of obtaining the third set of database can be performed with reference to block 506 as discussed above.

At block 606, the computing device 430 may determine whether the third set of database operations, the first set of database operations and the second set of database operations are free of conflict. In accordance with a determination at block 606 that hat the third set of database operations and the first and second sets of database operations are free of conflict, the method proceeds to block 608, where the computing device 430 may generate the execution schedule indicating that the first, second and third applications are to be performed in parallel.

Continuing with the example in FIG. 4, the plurality of applications 410 further comprise a third application 3 415-3. As shown in FIG. 4, the second application 2 415-2 and the third application 3 415-3 have been performed in sequence according to the historical execution schedule 420. In this case, the computing device 430 may obtain a third set of database operations associated with the third application 3 415-3, and compare the third set of database operations with both the first and second sets of database operations.

In a case where the third set of database operations are in conflict with both the first and second set of database operations, the execution schedule 440 for the first, second and third applications for example may be determined as "application 1/application 2" to "application 3", which means that the application 1 415-1 and application 2 415-2 are to be performed in parallel and the application 3 cannot be started until both the application 1 415-1 and application 2 415-2 are finished.

In a case where the third set of database operations are in conflict with the first set of database operations but are free of conflict with the second set of database operations, the execution schedule 440 for the first, second and third applications for example may be determined as "application 1 to application 3"/"application 2", which means that the application 3 415-3 cannot be performed until the application 1 415-1 is finished, and a branch of application 1 415-1 together with application 3 415-3 can be performed in parallel with the branch of application 2 415-2.

In a case where the third application and any of the first or second application have been performed in sequence during the previous time period, a third set of database operations associated with the third application 3 415-3, and both the first and second sets of database operations are free of conflict, the computing device 430 may generate the execution schedule 440 for indicating that the first, second, and third applications 415-1, 415-2 and 415-3 are to be performed in parallel.

In some embodiments, the computing device 430 may further traverse all of the plurality of applications 410, and generate the execution schedule 440 for the plurality of applications 410 as shown in FIG. 4.

Referring back to FIG. 5, at block 512, the computing device 430 performs the plurality of applications 410 based on the execution schedule 440. In particular, the computing device 430 performs the first and second applications in parallel.

By generating an execution map based on historical execution of the plurality of applications and also the associated database operations, the embodiments of the present disclosure may determine a more accurate parallel execution schedule, thereby improving the efficiency for performing the plurality of applications.

Figure 7:
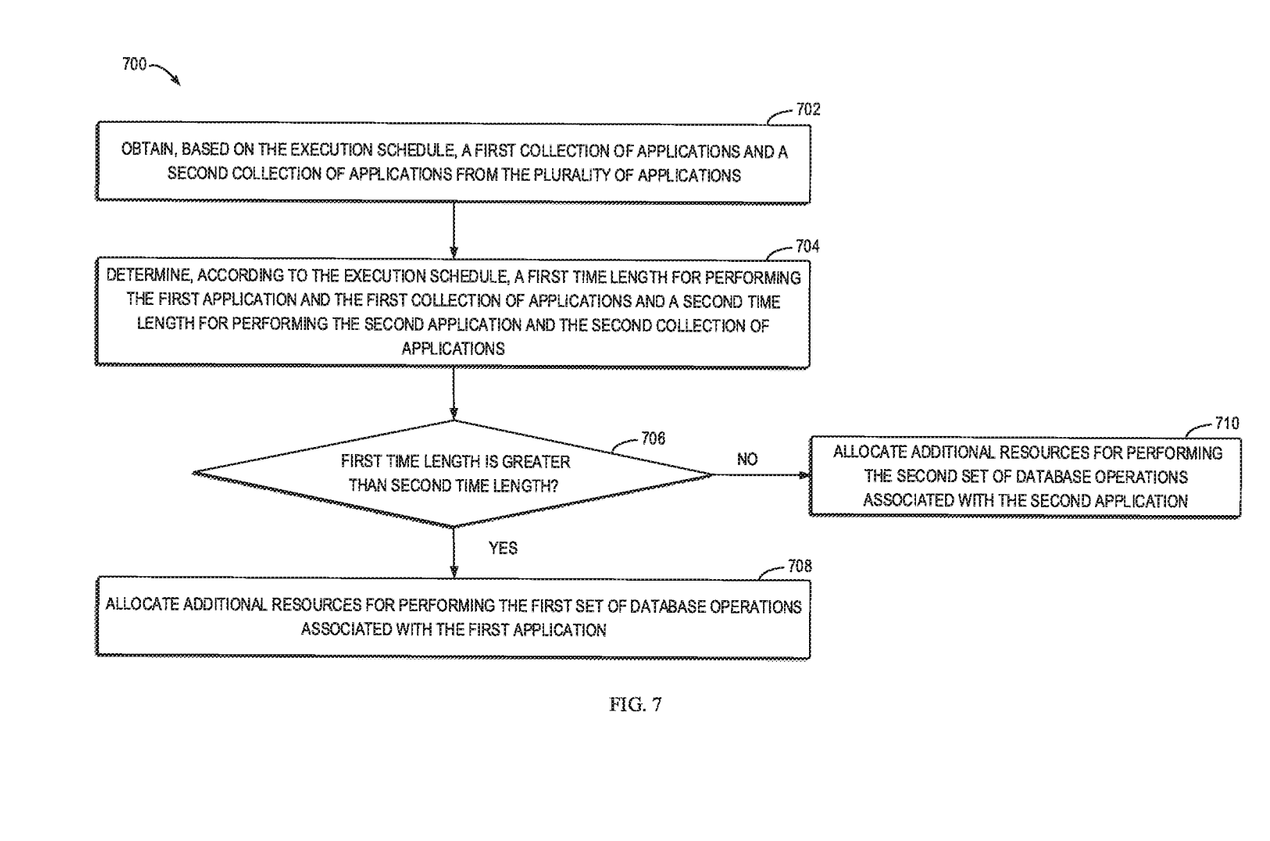
FIG. 7 depicts a flowchart of an approach for allocating resources for applications according to an embodiment of the present disclosure.

In some embodiments, the computing device 430 may further control the allocation of resources for the first and second applications based on time lengths required to finish the first/second applications and a first/second collections of applications depending on the first/second applications. FIG. 7 illustrates a flowchart of a method 700 for allocating resources for applications according to an embodiment of the present disclosure.

At block 702, the computing device 430 may obtain, based on the execution schedule 440, a first collection of applications and a second collection of applications from the plurality of applications 410, the first collection of applications depending on the first application, and the second collection of applications depending on the second application. In a case where an application cannot be started if any of the prior applications have not been finished, the prior applications may herein be referred to as applications on which the application depends.

Continuing the example in FIG. 4, for example, for application 1 415-1 and application 2 415-2, the computing device 430 may determine that there is no application which depends on them. For application 3 415-3, the computing device 430 may determine that application 4 415-4 and application 5 415-5 depend on the application 3 415-3.

At block 704, the computing device 430 may determine, according to the execution schedule 440, a first time length for performing the first application and the first collection of applications and a second time length for performing the second application and the second collection of applications. For example, when performing application 1 415-1, application 2 415-2 and application 3 415-3 in parallel according to the execution schedule 440, the computing device 430 may determine the time length for performing each of the applications 415-1, 415-2 and 415-3 itself along with any applications depending on it.

In some embodiments, the time length may be determined based on the amount of data to be processed by the respective application. Taking application 3 415-3 as the first application and application 1 415-1 as the second application, the computing device 430 may, for example determine, based on the amount of data to be processed, that a time length for application 1 415-1 is 10 minutes, a time length for application 3 is 5 minutes, a time length for application 4 415-4 is 8 minutes, and a time length for application 5 is 3 minutes. In this case, the computing device 430 may determine that a second time length for performing the first application and the first collection of applications is 10 minutes, and a first time length for performing the second application and the second collection of applications is 13 minutes (sum of the time lengths for application 3 415-3 and application 4 415-4), which is the longest time length among the branches associated with application 3 415-3.

At block 706, the computing device 430 may determine whether the first time length is greater or less than the second time length. In accordance with a determination that the first time length exceeds the second time length, the method 700 proceeds to block 708, where the computing device 430 may allocate additional resources for performing the first set of database operations associated with the first application. Continuing the example in FIG. 4, in a case that the first time length (e.g., 13 minutes) for performing the application 3 415-3 and the collection of applications depending on the application 3 415-3 is greater than the second time length (e.g., 10 minutes) for performing application 1 415-1, the computing device 430 may allocate additional resources for performing the set of database operations associated with the application 3 415-3.

In some embodiments, the allocated additional resources comprise at least one of: for example, CPU resource, IO resource, sort pool resource, RID pool resource, memory resource, or storage resource and the like. In some embodiments, the computing device 430 may decrease an amount of resources allocated for performing the second set of database operations, and then allocate the amount of resources as the additional resource for performing the first set of database operations associated with the first application. In this way, a time length for performing the plurality of applications 410 as a whole can be reduced, thereby improve the efficiency of the execution of the plurality of applications 410.

Similarly, in accordance with a determination that the first time length is less than the second time length, the method 700 proceeds to block 710, where the computing device 430 may allocate additional resources for performing the second set of database operations associated with the second application.

In some embodiments, the computing device 430 may periodically perform the processes 602 to 610 as discussed with reference to FIG. 6, thereby allowing for a dynamic allocation of resources based on the determined time length. In this way, by reducing the effects of inaccurate estimation of time length, the resource will be allocated in a more reasonable way.

In some embodiments, if more than two applications are performed in parallel according to the execution schedule 440, the computing device 430 may allocate more resource for an application the branch associated with which needs a longer time length, and allocate less resource for the application the branch associated with which needs a shorter time length.

Figure 8:
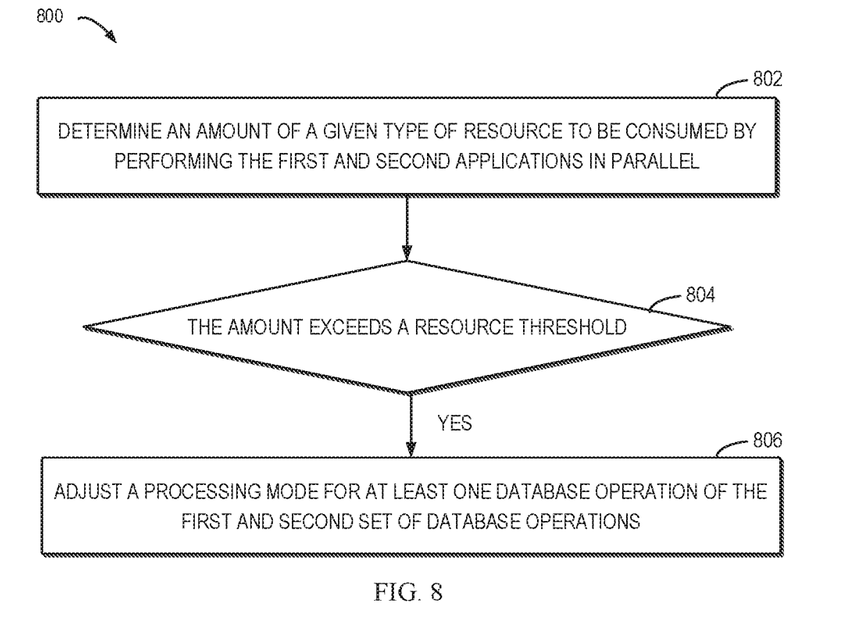
FIG. 8 depicts a flowchart of an approach for adjusting a processing mode for a database operation according to an embodiment of the present disclosure.

In some embodiments, to further improve the efficiency for performing the plurality of applications 410, the computing device 430 may also dynamically adjust the processing mode for at least some of database operations. FIG. 8 illustrates a flowchart of a method 800 for adjusting a processing mode for a database operation according to an embodiment of the present disclosure.

As shown in FIG. 8, at block 802, the computing device 430 may determine an amount of a given type of resource to be consumed when performing the first and second applications in parallel. At block 804, the computing device 430 may determine whether the amount exceeds a resource threshold. In accordance with a determination at block 804 that the amount exceeds the resource threshold, the method 800 proceeds to block 806, where the computing device 430 may adjust a processing mode for at least one database operation of the first and second set of database operations to reduce the amount of the given type of resource to be consumed.

For example, in a case where most of the database operations in the first and second sets of applications are related to JOIN operations, the amount of sort resource to be consumed is quite large and exceeds resource threshold. In this case, due to the limitation of the sort resource, the time for performing the plurality of applications 410 will become longer. To reduce the amount of the sort resource to be consumed, the computing device 430 may, for example, adjust the processing mode of at least one database operation in the first and second sets of applications from the mode "sort-merge join" to "nested loop join."

In some embodiments, the computing device 430 may further store the execution schedule 440. In response to receiving a further request to perform a set of applications among the plurality of applications 410, the computing device 430 may perform the set of applications according to the stored execution schedule 440. For example, if a further request to perform application 4 415-4 and application 5 415-5 is received, the computing device 430 may perform the application 4 415-4 and application 5 415-5 in parallel according to the execution schedule 440. In another example, if a further request to perform application 2 415-2 and application 4 415-4 is received, the computing device 430 may perform the application 2 415-2 and application 4 415-4 in parallel, since the application 2 415-2 and application 4 415-4 belong to different branches in the execution schedule 440. In this way, the computing device 430 may automatically perform applications with parallelism according to the stored execution schedule without regenerating the execution schedule 440.

It should be noted that the processing of parallel execution of applications according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    responsive to receiving a request to perform a plurality of applications including a first application and a second application, determining, by one or more processors, that the first application and the second application have been performed sequentially during a previous time period;
    responsive to determining that the first and second applications have been performed sequentially during the previous time period, obtaining, by one or more processors, a first set of database operations associated with the first application and a second set of database operations associated with the second application;
    determining, by one or more processors, that the first set of database operations and the second set of database operations are free of conflict based on the first set of database operations and the second set of database operations not modifying a same database element;
    responsive to determining that the first set of database operations and the second set of database operations are free of conflict, generating, by one or more processors, an execution schedule indicating that the first application and the second application are to be performed in parallel;
    performing, by one or more processors, the plurality of applications based on the execution schedule;
    obtaining, by one or more processors, based on the execution schedule, a first collection of applications and a second collection of applications from the plurality of applications, the first collection of applications depending on the first application, the second collection of applications depending on the second application;
    determining, by one or more processors, according to the execution schedule, (i) a first time length for performing the first application and the first collection of applications and (ii) a second time length for performing the second application and the second collection of applications;
    determining, by one or more processors, that the first time length exceeds the second time length; and
    responsive to determining that the first time length exceeds the second time length, allocating, by one or more processors, additional sort pool resources for performing the first set of database operations associated with the first application.

2. The computer-implemented method of claim 1, wherein the plurality of applications further comprise a third application, further comprising:
    determining, by one or more processors, that the first application, the second application, and the third application have been performed in sequence during the previous time period;
    responsive to determining that the first application, the second application, and the third application have been performed in sequence during the previous time period, obtaining, by one or more processors, a third set of database operations associated with the third application; and
    responsive to determining that the first set of database operations, the second set of database operations and the third set of database operations are free of conflict, generating, by one or more processors, the execution schedule indicating that the first, second and third applications are to be performed in parallel.

3. The computer-implemented method of claim 1, wherein allocating the additional sort pool resources comprises:
    decreasing, by one or more processors, a set of resources allocated for performing the second set of database operations; and
    allocating, by one or more processors, the set of resources as the additional sort pool resources for performing the first set of database operations associated with the first application.

4. The computer-implemented method of claim 1, further comprising:
    storing, by one or more processors, the execution schedule; and
    responsive to a further request to perform a set of applications among the plurality of applications, performing, by one or more processors, the set of applications according to the stored execution schedule.

5. The computer-implemented method of claim 1, wherein obtaining the first set of database operations and the second set of database operations comprises:

pre-compiling, by one or more processors, the first application and the second application to extract a first set of queries associated with the first application and a second set of queries with the second application; and determining, by one or more processors, the first set of database operations and the second set of database operations from the first set of queries and the second set of queries.

6. The computer-implemented method of claim 1, further comprising:

determining, by one or more processors, an amount of a given type of resource to be consumed when performing the first application and the second application in parallel; and responsive to determining that the amount exceeds a threshold, adjusting, by one or more processors, a processing mode from a first join algorithm to a second join algorithm for a database operation of the group consisting of: the first set of database operations and the second set of database operations, to reduce the amount of the given type of resource to be consumed.

7. The computer-implemented method of claim 1, wherein the plurality of applications are a plurality of programs, the first application is a first program, and the second application is a second program.

8. A computer program product comprising:

one or more computer readable storage media and program instructions collectively stored on the one or more computer readable storage media, the program instructions comprising:

program instructions to, responsive to receiving a request to perform a plurality of applications including a first application and a second application, determine that the first application and the second application have been performed sequentially during a previous time period;

program instructions to, responsive to determining that the first and second applications have been performed sequentially during the previous time period, obtain a first set of database operations associated with the first application and a second set of database operations associated with the second application;

program instructions to determine that the first set of database operations and the second set of database operations are free of conflict based on the first set of database operations and the second set of database operations not modifying a same database element;

program instructions to, responsive to determining that the first set of database operations and the second set of database operations are free of conflict, generate an execution schedule indicating that the first application and the second application are to be performed in parallel;

program instructions to perform the plurality of applications based on the execution schedule;

program instructions to obtain, based on the execution schedule, a first collection of applications and a second collection of applications from the plurality of applications, the first collection of applications depending on the first application, the second collection of applications depending on the second application;

program instructions to determine, according to the execution schedule, (i) a first time length for performing the first application and the first collection of applications and (ii) a second time length for performing the second application and the second collection of applications;

program instructions to determine that the first time length exceeds the second time length; and program instructions to, responsive to determining that the first time length exceeds the second time length, allocate additional sort pool resources for performing the first set of database operations associated with the first application.

9. The computer program product of claim 8, wherein the plurality of applications further comprise a third application, further comprising:

program instructions, collectively stored on the one or more computer readable storage media, to determine that the first application, the second application, and the third application have been performed in sequence during the previous time period;

program instructions, collectively stored on the one or more computer readable storage media, to, responsive to determining that the first application, the second application, and the third application have been performed in sequence during the previous time period, obtain a third set of database operations associated with the third application; and program instructions, collectively stored on the one or more computer readable storage media, to, responsive to determining that the first set of database operations, the second set of database operations and the third set of database operations are free of conflict, generate the execution schedule indicating that the first, second and third applications are to be performed in parallel.

10. The computer program product of claim 8, wherein program instructions to allocate the additional sort pool resources comprise:

program instructions to decrease a set of resources allocated for performing the second set of database operations; and program instructions to allocate the set of resources as the additional sort pool resources for performing the first set of database operations associated with the first application.

11. The computer program product of claim 8, further comprising:

program instructions, collectively stored on the one or more computer readable storage media, to store the execution schedule; and program instructions, collectively stored on the one or more computer readable storage media, to, responsive to a further request to perform a set of applications among the plurality of applications, perform the set of applications according to the stored execution schedule.

12. The computer program product of claim 8, wherein program instructions to obtain the first set of database operations and the second set of database operations comprise:

program instructions to pre-compile the first application and the second application to extract a first set of queries associated with the first application and a second set of queries with the second application; and program instructions to determine the first set of database operations and the second set of database operations from the first set of queries and the second set of queries.

13. The computer program product of claim 8, further comprising:

program instructions, collectively stored on the one or more computer readable storage media, to determine an amount of a given type of resource to be consumed when performing the first application and the second application in parallel; and program instructions, collectively stored on the one or more computer readable storage media, to, responsive to determining that the amount exceeds a threshold, adjust a processing mode from a first join algorithm to a second join algorithm for a database operation of the group consisting of: the first set of database operations and the second set of database operations, to reduce the amount of the given type of resource to be consumed.

14. A computer system comprising:

one or more computer processors, one or more readable storage media, and program instructions collectively stored on the one or more computer readable storage media for execution by at least one of the one or more computer processors, the program instructions comprising:

program instructions to, responsive to receiving a request to perform a plurality of applications including a first application and a second application, determine that the first application and the second application have been performed sequentially during a previous time period;

program instructions to, responsive to determining that the first and second applications have been performed sequentially during the previous time period, obtain a first set of database operations associated with the first application and a second set of database operations associated with the second application;

program instructions to determine that the first set of database operations and the second set of database operations are free of conflict based on the first set of database operations and the second set of database operations not modifying a same database element;

program instructions to, responsive to determining that the first set of database operations and the second set of database operations are free of conflict, generate an execution schedule indicating that the first application and the second application are to be performed in parallel;

program instructions to perform the plurality of applications based on the execution schedule;

program instructions to obtain, based on the execution schedule, a first collection of applications and a second collection of applications from the plurality of applications, the first collection of applications depending on the first application, the second collection of applications depending on the second application;

program instructions to determine, according to the execution schedule, (i) a first time length for performing the first application and the first collection of applications and (ii) a second time length for performing the second application and the second collection of applications;

program instructions to determine that the first time length exceeds the second time length; and program instructions to, responsive to determining that the first time length exceeds the second time length, allocate additional sort pool resources for performing the first set of database operations associated with the first application.

15. The computer system of claim 14, wherein the plurality of applications further comprise a third application, further comprising:

program instructions, collectively stored on the one or more computer readable storage media for execution by at least one of the one or more computer processors, to determine that the first application, the second application, and the third application have been performed in sequence during the previous time period;

program instructions, collectively stored on the one or more computer readable storage media for execution by at least one of the one or more computer processors, to, responsive to determining that the first application, the second application, and the third application have been performed in sequence during the previous time period, obtain a third set of database operations associated with the third application; and program instructions, collectively stored on the one or more computer readable storage media for execution by at least one of the one or more computer processors, to, responsive to determining that the first set of database operations, the second set of database operations and the third set of database operations are free of conflict, generate the execution schedule indicating that the first, second and third applications are to be performed in parallel.

16. The computer system of claim 14, wherein program instructions to allocate the additional sort pool resources comprise:

program instructions to decrease a set of resources allocated for performing the second set of database operations; and program instructions to allocate the set of resources as the additional sort pool resources for performing the first set of database operations associated with the first application.

17. The computer system of claim 14, further comprising:

program instructions, collectively stored on the one or more computer readable storage media for execution by at least one of the one or more computer processors, to store the execution schedule; and program instructions, collectively stored on the one or more computer readable storage media for execution by at least one of the one or more computer processors, to, responsive to a further request to perform a set of applications among the plurality of applications, perform the set of applications according to the stored execution schedule.

* * * * *